Sept. 18, 1956 J. B. McCORMICK 2,763,070
PLASTIC MOLDED ANATOMICAL MODEL AND METHOD
OF MOLDING PLASTIC ARTICLES
Filed May 22, 1953 2 Sheets-Sheet 2
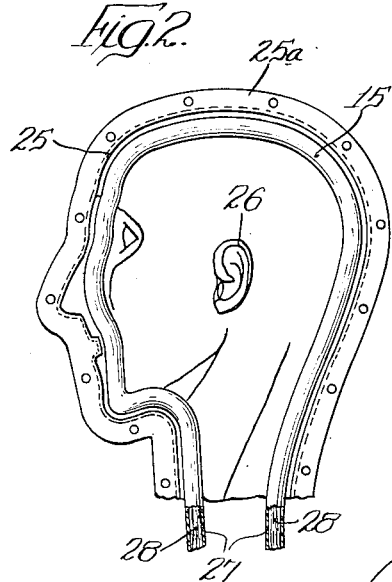
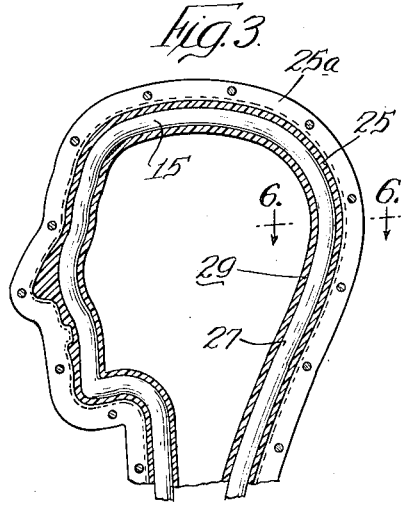
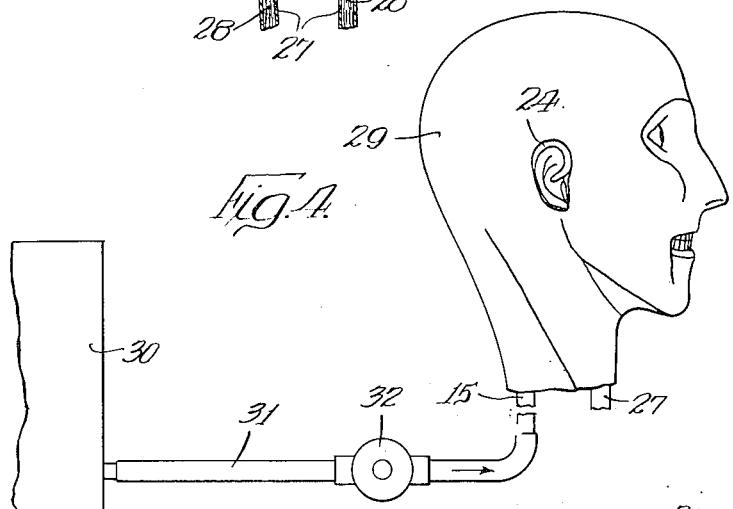
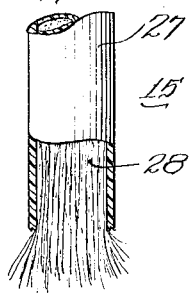
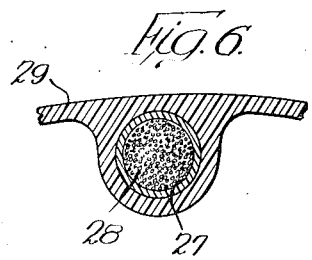
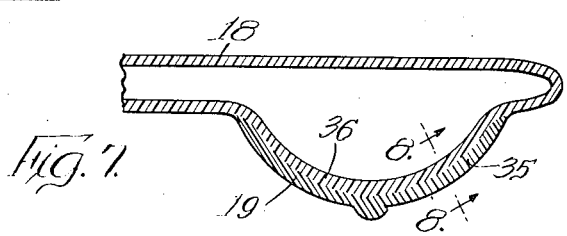
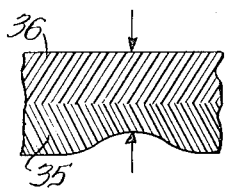
INVENTOR.
James B. McCormick
BY
McKenna & Morsbach
Attys United States Patent Office 2,763,070
Patented Sept. 18, 1956

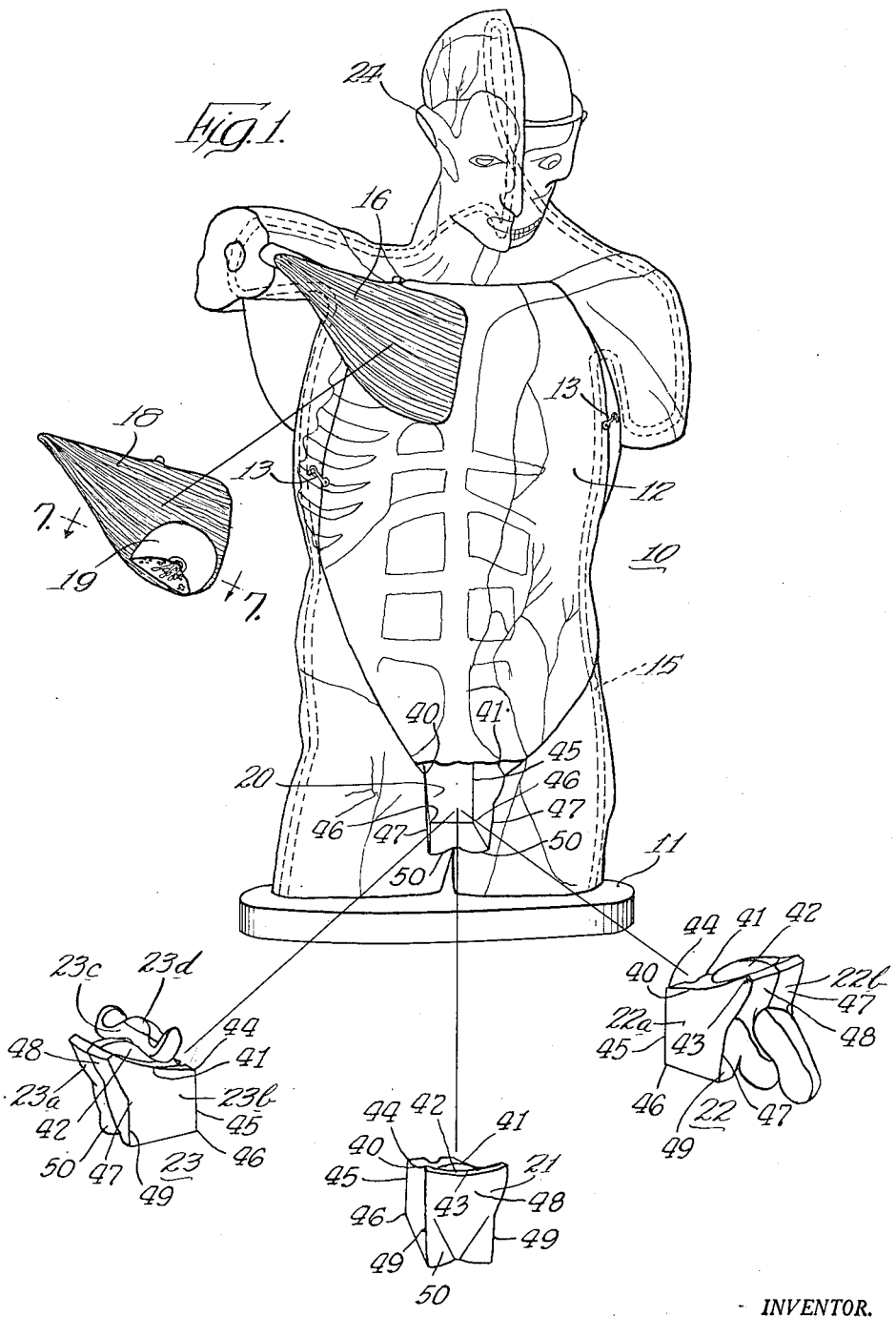

2,763,070

PLASTIC MOLDED ANATOMICAL MODEL AND METHOD OF MOLDING PLASTIC ARTICLES

James B. McCormick, Chicago, Ill.

Application May 22, 1953, Serial No. 356,841

8 Claims. (Cl. 35—17)

The present invention relates to anatomical models, and more particularly to anatomical models molded from a resinous material. The invention also relates to new techniques in producing molded products from plastic.

Anatomical models have been utilized for years by medical schools, hospitals and the like as a teaching aid in connection with teaching the details of the human anatomy as well as the details of zoological creatures. For many years heretofore anatomical models have been molded from plaster of Paris or similar material, and were relatively fragile. Obviously, also, the material had a single, uniform hardness characteristic which was not at all similar to the characteristics of the parts of the human body in the case of an anatomical model of the human body, which parts vary widely as regards the feel characteristics thereof; certain portions of the body being relatively hard such as the skull, and other portions of the body being very soft, particularly internal organs, such as the lungs, intestines and the like. Such prior anatomical models were affected by climate and were subject to damage if handled roughly. They were, moreover, subject to chipping, scratching and marring, so that after a relatively short time such prior models were very unsatisfactory. Also, anatomical models have been made of rubber compounds known as latex, but these are not altogether satisfactory. For example, they must be molded in plaster molds which are breakable and non-permanent; they are subject to quite variable shrinkage in the molding and because of this unstable condition there is non-uniformity in the resultant molded forms; the rubber being an organic compound is subject to oxidation and decay; the latex does not age well and is subject to cracking; the latex cannot be molded into intricate and undercut shapes with two-piece molds; the surface condition after molding requires special treatments such as sealing and priming as distinguished from a molded surface ready for lacquering; and the latex is hydroscopic and subject to absorption of moisture which contributes to decay. For these and other reasons such rubber compounds have been objectionable.

It would be desirable to provide an anatomical model formed of a superior material which is unaffected by climate and which has great durability. Such an anatomical model should be one made from a material which is chip, tear, and scratchproof, and which may be repeatedly washed without in any way adversely affecting the model. Such an anatomical model should also preferably be one in which the color of the major portion thereof is pigmented in the molded material, thereby assuring lifelong color fastness.

Anatomical models are really three-dimensional models designed to afford students a more accurate reproduction of nature. It is important that such models contain intricate and flawless details of the anatomical structure. It would be desirable to provide an anatomical model in which not only color and appearance are reasonably lifelike, but in which, to the sense of touch, the model is reasonably lifelike. In other words, the model should have variations of the physical properties of the organ or structure incorporated in the model structure. Organs such as the lungs, stomach and brain should feel much like the corresponding organs in true life.

It will be appreciated that anatomical models are relatively expensive, particularly where they permit complete dissection of all the organs and where complete detail of the human body with respect to the circulatory system, the nervous system, the musculature and the like, is fully disclosed. For certain studies it will be obvious that an anatomical model of a female is necessary, and for other studies an anatomical model of a male is necessary. It would be desirable to provide an anatomical model with interchangeable parts which may readily be converted from a male to a female model, or, if desired, to a neuter model, whereby with one basic model and additional parts the complete human anatomy may be studied and taught.

It will be apparent that a model of a human body, particularly if it approaches life size, requires support of a substantial mass on relatively slender supporting means such as the legs of the body. In the human body, of course, there is incorporated a skeleton which lends rigidity and support thereto. In anatomical models which have been constructed heretofore, it has been the practice to insert rigid rods or the like to give the necessary strength and rigidity to the model. Unfortunately, in molding such a model there are, obviously, many undercut portions necessary in the mold if a relatively simple two-part mold is to be employed. Any rigid reinforcing means will interfere with the removal of the molded model from the mold insofar as undercut portions thereof are concerned. It would be desirable to provide a rigid supporting means for an anatomical model which would be the equivalent of steel rods or the like and yet which would not interfere with the removal of the molded part from the mold immediately following the manufacture thereof.

Insofar as the human body, or zoological or biological models which are similarly embraced by the present invention have parts thereof which vary in structural characteristics, such as the same part having hard and soft portions, it would be desirable to provide an anatomical model where the same part may have hard and soft portions. Moreover, an improved anatomical model should be capable of being manufactured in an economical manner so that it may be competitive with less desirable anatomical models heretofore available.

Accordingly, it is an object of the present invention to provide a new and improved model especially adapted for use as an anatomical, zoological, or biological model.

It is another object of the present invention to provide an improved anatomical model formed of a vinyl resin which has variations in physical property according to the actual structure that a particular part of the model represents, whereby the model will feel much like the real object it represents.

It is another object of the present invention to provide a single anatomical model with a few interchangeable parts whereby it may serve as a model of a male or a female.

It is another object of the present invention to provide an improved method of insuring rigidity in an object molded from plastic material, which rigidity will not interfere with removing the model from undercut portions of the mold in which the model is made.

It is another object of the present invention to provide an anatomical model from a material which has great resistance to breakage, oxidative decay and the like.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a partial exploded view of an anatomical model illustrating not only the structural supporting means of the present invention, but also the interchangeability of parts;

Fig. 2 is a top view of a portion of one-half of a simple mold to illustrate one step in the molding process of the present invention where a rigid support is to be provided;

Fig. 3 is a view similar to Fig. 2, with the molding process having been completed and showing a sectional view through the molded article to illustrate another step in the process of the present invention;

Fig. 4 is a view partly in section of the molded article made by the process partly illustrated by Figs. 2 and 3 to illustrate a still further step in the process of the present invention;

Fig. 5 is an enlarged view, partly in section, of a portion of the reinforcing means employed in the construction of Figs. 1, 2, 3 and 4;

Fig. 6 is an enlarged sectional view through the molded article only taken on line 6—6 of Fig. 3, assuming that Fig. 3 shows the complete structure;

Fig. 7 is an enlarged sectional view taken on line 7—7 of Figure 1; and

Fig. 8 is an enlarged sectional view taken on line 8—8 of Fig. 7, assuming that Fig. 7 shows the complete structure.

Briefly, the present invention is concerned with anatomical models which might include zoological as well as biological models which faithfully duplicate the texture and feel as well as the appearance of actual tissues, organs and other parts of the human body in the case of a human anatomical model, or similar parts in zoological or biological models. These models are molded in metal molds of a vinyl plastisol. A special plastisol compound was developed which would have great strength and rigidity after curing and yet which would be sufficiently fluid in the uncured state to fill out even the most intricate details in the molds. For providing rigidity, a flexible plastic tube is inserted in the mold in any desired position, which tube is filled with a glass fiber or similar material. When the fused plastic mold is removed from undercut sections of a two piece mold, a suitable self-curing resin is pumped into the integrally placed fiber filled tube, which resin hardens effectively to form a rigid skeleton. By means of an improved process, different degrees of hardness are combined in a single part. This is accomplished by blending plastisols with different molecular weights into a single structure through the use of overlays and controlled fusion.

Referring now to the drawings, and particularly to Fig. 1, there is illustrated an anatomical model generally designated by the reference numeral 10. This model comprises a large integral mold part comprising the main portion of the trunk, and the beginning portions of the arms and legs. Obviously, it could include the complete arms and legs if desired. The model is illustrated as being secured to a suitable base 11. Although the present invention is not concerned with the dissectable portions of the model, actually the entire front portion from the chest through and including the abdominal region is formed as a removable cover, generally designated by the reference numeral 12, which cover is secured by suitable fastening means as indicated at 13 to the main integral mold portion. All parts of the model show details of the circulatory system, the musculature, bone structure and the like, and dissections are provided at numerous places to supply further details. Within the chest and abdominal cavity, although not shown in the drawings, are the various organs of the body disposed in their natural position and readily removable to afford the student the maximum information. These organs are reproduced, as will be apparent from the following description, with the texture and color corresponding very closely to the actual organs or parts which they represent. In all cases the circulatory system, the nervous system and the like are shown in detail. It should be understood that these organs and parts thereof are molded in the manner described hereinafter.

For the purpose of lending rigidity to the anatomical model shown in Fig. 1, there is provided a member designated by the reference numeral 15 which performs this function and which is described in greater detail in connection with a less complicated model. As will become apparent from the following description, this means 15 comprises a tube filled with fiber glass or similar material, and which, initially, is completely flexible and can be distorted into any position. In Fig. 1 it may be observed that this means 15 assumes a very twisted and complicated position so as to extend into all parts of the model which require support, to make sure that an indestructible model is provided. In accordance with the present invention, this means 15, when the model is completed, becomes a very rigid support which would be the equivalent of a steel member initially deformed to the shape shown in Fig. 1.

In order that a single model may suffice to illustrate all features of the human body, the model 10 is provided with interchangeable sex organs. Secured to the model in a removable manner and designated by the reference numeral 16 is the pectoralis major muscle. This muscle will illustrate the condition of the male or neuter body. When the anatomical model is to represent the female body, an interchangeable pectoralis major muscle may be substituted, designated by the reference numeral 18. This member 18 includes a portion of the female breast, indicated at 19, which is dissected to show the lactiferous ducts and other structures of the mammary gland.

In accordance with the present invention, the pelvic region of the anatomical model 10 includes a recess, generally designated by the reference numeral 20, which is adapted to receive either of three units designated by the reference numerals 21, 22 and 23. The pelvic recess 20 is of predetermined shape and each of the units 21, 22 and 23 is shaped to fit into said pelvic recess. Each unit 22 and 23 is further shaped to incorporate or portray certain genital characteristics such as the male and the female, respectively. The third unit 21 is shaped externally to portray a neutral or sexless form adapted for use in elementary schools where sex anatomy is not taught. Referring more particularly to the drawings, it will be observed that each unit model is shaped exteriorly to fit into the pelvic recess 20, and, furthermore, to include certain exterior genital characteristics distinguishing the male from the female and also the neutral form as above mentioned. As to the shape of said pelvic recess and the corresponding shape or matching shape of the units, this may best be observed from the individual units 21, 22 and 23 shown in Figure 1. This recess and the corresponding unit shapes are defined approximately by lines 40 and 41 along the lateral margin of the urinary bladder 42 at each side thereof extending from the pubic ramus 43 of the adjacent side to the perirectal fossa 44 defining the top lateral margin of the recess, a second line 45 extending from each lateral fossa line 44 inferiorly to the perirectal area 46 at the anus defining the posterior boundary, and a line 47 extending inferiorly from each first mentioned line at the lateral pubic ramus 43 on each side including therebetween the pubic moms 48 and margins of the thighs 49 and genital folds 50 defining the anterior boundary. The element 21 is a single element insertable into the recess 20 to convert the anatomical model 10 to a sexless model as abovementioned and would be used with the element 16 described above. If it is desired to convert the anatomical model 10 to a male model, the recess 20 would have inserted therein the unit 22 defining the male genitalia. As illustrated, the unit 22 is bisected in the mid-sagittal plane to define two portions 22a and 22b. The complete male reproductive system is illustrated internally (not shown) on this bisection including testicles, spermatic cords, prostate and penis. If it is desired to convert the anatomical model 10 to a female model, the unit 23 will be inserted into the recess 20. Actually, the unit 23 consists of four parts: the right and left halves 23a and 23b of the external female genitalia, including the pelvic soft tissues, and a two-piece dissection of the uterus and ovaries designated as 23c and 23d, respectively. The parts 23c and 23d are to be removed from the unit 23 when the latter is inserted into the pelvic recess 20. It will be apparent that when the unit 23 is disposed in the recess 20, the portion 18 will replace the portion 16, thereby providing a complete model of the female body. Thus, there is provided an anatomical model which can readily be converted to a male, female or neuter model, as the case may be, with a minimum of expense.

As will become apparent from the following description, the interchangeable parts described above are all constructed in a manner to have the appearance, color and feel characteristics of the body structure which they are to simulate.

Preferably, the anatomical model 10 is constructed by pressure molding in metal molds. These metal molds can be constructed with great detail, and are preferably made initially from actual human parts in the case of a human anatomical model. In this way it is possible to attain consistent reproduction of the most intricate structures with flawless detail. It will be understood, however, that in the mold structures required to produce any anatomical model such as 10 there are numerous undercut portions required in the mold. For example, the ear portion 24 of the model of Fig. 1 and numerous other protrusions require the molded material to be disposed in an undercut portion, which means that upon removal from the mold the molded material must have sufficient flexibility or, otherwise, the article would be torn or destroyed in the removal from the mold. Obviously, with such numerous undercut portions it would be impossible to insert rigid means such as steel rods or the like to give the structure a sort of skeleton or framework, since this would preclude the molded parts disposed in undercut portions of the mold from being removed from the mold.

In accordance with the present invention, there has been provided an improved method for lending rigidity to a molded part but only after the part has been removed from the mold, which rigidity is equivalent to that which would be provided by originally inserting into the mold rigid bar or rod material or the like. As far as this phase of the invention is concerned, it is applicable to molded structures in general which require reinforcing means for strength purposes and is not limited to use in anatomical models. It is intended in the appended claims to cover this feature of applicant's invention not necessarily limited to a particular molded product such as an anatomical model. It will be understood that the mold structure for the anatomical model 10 shown in Fig. 1, and the details of the supporting means 15 could have been illustrated to bring out this feature of applicant's invention. However, the mold required for the model 10 of Fig. 1 is relatively complicated, and this feature of applicant's invention has been illustrated in the drawings by employing a relatively simple mold structure of only the head portion of the model with undercut portions therein to accommodate the ear 24 of a molded head. Obviously, the mold will, in most cases, be more complicated, but for the purpose of describing this phase of applicant's invention, a more simple mold structure will suffice.

Referring now to Figs. 2 to 6 of the drawings, there is illustrated a two-part mold comprising mold halves 25, only one of which is shown in Figs. 2 and 4, which mold halves are suitably clamped together at a junction point comprising the flanges 25a. It will be understood that the mold halves 25 are intended to extend beyond the head for molding other portions of the model, and the remaining portion thereof has been omitted for the sake of simplifying the disclosure. The interior portion of the mold is very intricately formed to reproduce all the details that are desired to be reproduced on a model molded in the mold, generally designated by the mold halves 25. In Fig. 2 there is illustrated the one mold half with some of the details of the mold visible therein, including the portion 26 for molding one ear of the model, which portion comprises an undercut section. In order to provide an eventually rigid skeleton, there is illustrated the means 15 previously discussed, which, as is best shown in Fig. 5, comprises a flexible plastic tube 27, which may be any thin-walled readily distortable tube. Preferably, this tube is filled with a plurality of fibers designated by the reference numeral 28, and in a preferred embodiment these fibers comprise glass fibers. This tube 27, filled with the glass fibers 28, is very flexible and may be distorted in any manner. As illustrated in Fig. 2, this means 15 is disposed within the mold half in any desired position so that it will form a skeleton particularly adapted to support any protruding portions. This can better be appreciated from the more complicated model shown in Fig. 1 of the drawings. The ends of the plastic tube filled with the fibers 27 are permitted to extend through suitable openings defined in the mold so that both ends of the tube 27 terminate outside the mold. The other half 25 of the mold is then put into position, and the two mold halves are secured together by any suitable fastening means which might comprise bolts, or other securing means, extending through the flanges 25a. The resinous material, preferably vinyl plastisol as described in greater detail hereinafter, in liquid form is then inserted into the mold cavity and it flows into intimate contact with all of the wall portions thereof, so that a coat is produced surrounding the means 15 and also surrounding the entire mold cavity. The resinous material is slushed into the cavity so it contacts the entire mold wall. The thickness of the wall material produced may vary depending upon the amount of vinyl plastisol introduced into the mold and the successive slushings of the mold. When the mold has the desired amount of liquid resin inserted therein, the material in the mold is heat cured, as will be described in greater detail hereinafter, whereupon the mold is opened to present a cross-sectional view of the model somewhat like that shown in Fig. 3 with the molded material indicated in cross section by the reference numeral 29. The molded article removed from the mold is best shown by the reference numeral 29 in Fig. 4 of the drawings, and it will be apparent that protruding from the molded object will be the ends of the plastic tube 27 containing therein the fibrous material 28.

In order to provide the rigid reinforcing means, and in accordance with the present invention, one or both ends of the tube 27 protruding from the molded article 29 are then connected to a suitable source of liquid plastic under pressure. Such a source is designated by the reference numeral 30, which is connected through a conduit 31 and a pump 32 with the plastic tube 27. A self-curing resin is pumped into the tube 27 so as to completely impregnate the fibrous material contained therein, and after a short time this resin causes the flexible tube 27 and the material contained therein to have the hardness and rigidity which is comparable to the similar characteristics of a metal rod or the like.

It should be understood that the molded article 29, when being removed from the mold, is of relatively flexible nature, so that undercut portions of the mold will not interfere with the removal of the molded article and yet, upon completion of the process illustrated in Fig. 4, a completely rigid skeleton is provided for the article which is commensurate with what would be obtained if metal means were originally inserted into the mold to provide this rigidity.

Considering now the details of the molding operation, aside from incorporating the means 15 described above therein, it will be appreciated that for an anatomical model such as is shown in Fig. 1 a large quantity of vinyl resin is required, and some of the models may contain as much as thirty-five pounds of vinyl plastisol. The special plastisol compound that is preferably employed is a thermosetting compound having great strength and rigidity after curing, and yet which in the uncured state is sufficiently fluid to fill even the most intricate details of the molds employed. In most plastisols which have been employed heretofore, the resin-to-plasticizer ratio is approximately one to one, whereas in the plastisol employed in connection with the models of the present invention a resin-to-plasticizer ratio of approximately ten to three was employed. Such molded vinyl plastisol material is unaffected by climate, possesses lifelike flexibility and great durability. In addition, the basic colors can be pigmented in the liquid resin, so that the resultant model has a lifelong color fastness.

Another of the most important features of the present invention resides in the variation of physical properties of the resultant plastisol model according to the characteristics of the particular part of the anatomy that it represents. With the present invention it is possible to combine different degrees of hardness into a single part by blending plastisols with different molecular weights into one structure through the use of overlays and controlled fusion. A plurality of different plastisols are preferably employed. One type of vinyl plastisol is formulated having a low plasticizer content and viscosity characteristics such as to permit it to be injected into a mold under low pressure. This compound results in a molded article which has great rigidity, and even thin-walled sections thereof are self-supporting or substantially self-supporting. It was found that this compound had a durometer hardness of 85 to 90 on a Shore "A" scale. The hot tear strength of this material when molded is such that it can be removed from the mold and undercut portions of the mold do not interfere, and yet, upon cooling, great rigidity is produced so that in many cases the reinforcing means 15 described above can be dispensed with.

For the softer parts of the anatomy, pigmented vinyl plastisols are used having a durometer hardness of 55 to 60 on a Shore "A" scale. These parts can be reproduced in the minute required detail, since the low viscosity of the liquid plastisols will search out the details of the mold surface. After fusion, however, the resultant elastomeric compound may be easily removed from the mold. The film strength of the vinyl plastisol used to make the softer parts of the anatomy lends durability, so that handling may be accomplished without fear of destruction, while the texture of the material closely approximates the counterpart of the organ that the model represents. In some cases it is desirable to employ a plastisol compound in which a blowing or foaming agent has been incorporated to provide a resultant molded product which is very soft. This employed for example in making the breast portion 19 of part 18 shown in Fig. 1 of the drawings.

When the correct materials have been chosen for the particular parts, they are inserted in liquid form under low pressure into the mold cavity, where they are allowed to gel at a relatively low heat range of between 100° and 200° F., preferably in the neighborhood of 150° F. After this, they are maintained at an elevated temperature of between 300° and 400° F., preferably in the neighborhood of 350° F., while still in the mold to effect cure and fusion of the thermosetting material. The fusion feature will be better understood from the ensuing description. Fairly accurate temperature control is necessary in the neighborhood of 350° F. to prevent overcure and charring. The cured pieces are then removed from the mold while they still are at a somewhat elevated temperature, and undercut portions of the mold will not interfere with their removal. The molded parts are then painted and air brushed to bring out the various features. Preferably, the veins, arteries and other parts applied by painting and art work are applied by decorative lacquers of the vinyl resin type so that they form a permanent bond with the plastic substructure. This results in a product which is chip, tear and scratchproof, and will not be injured by repeated washings with strong soap and the like.

In the human body it is apparent that the structural characteristics of different parts of the body vary substantially, and in the case of part 18 of Fig. 1 it will be apparent that substantial variations in the characteristics are essential. For example, the pectoralis major muscle has a fairly hard feel, so that portion of element 18 should be such as to provide a structure having a fairly rigid feel. On the other hand, the female breast portion 19 in the actual human body counterpart has a very soft texture, and it is necessary, therefore, in a single part such as the part 18 to provide two different textures for the single part. This can readily be accomplished with the present invention by the arrangement best shown in Figs. 7 and 8 of the drawings. The portion of the mold which forms the female breast portion 19 of the model portion 18 is first filled or slushed with a plastisol compound having a relatively soft texture when in cured condition. It might even contain a blowing or foaming agent to give a soft feel to the resultant product. As soon as this material has gelled over the surface of the mold, the mold is slushed again with a different material which will produce a more rigid structure. This is readily apparent from Fig. 7 of the drawings, where the portion designated by the reference numeral 35 represents the material applied by the first slush of only a portion of the mold to produce the relatively soft texture in the resultant product. The second slush of the entire mold which will coat the entire interior surface thereof and apply an additional coating to the portion 35 is designated by the reference numeral 36. A greatly enlarged cross-sectional view of this is illustrated in Fig. 8, where the material 35 is indicated as being relatively soft, as is evident by the force arrows which cause substantial distortion of the material 35 and substantially no distortion of the material 36. During the curing of the product of Fig. 7 while still in the mold at the elevated temperature of approximately 350° F., fusion occurs between the parts 35 and 36, which fusion was referred to above. Additionally, curing of the thermosetting material occurs to produce the final product, portions of which have different physical characteristics from the feel as well as the appearance standpoint.

In describing the present invention, certain specific elements or portions of the anatomical model were discussed in order to illustrate important aspects of the present invention. It will be understood that the same principles will apply to other parts of the anatomical model, and, in view of the detailed description included above, this will readily be understood by those skilled in the art. Moreover, this invention relates to the model per se, as well as the method of manufacturing the same or similar plastic articles.

While there has been illustrated and described what it at present believed to be a preferred embodiment of the present invention including the article as well as the process of manufacturing the same, numerous changes and modifications will readily occur to those skilled in the art. It is aimed in the appended claims to cover all such changes and modifications as fall within the true spirit and scope of the present invention.

What is claimed as new and desired to be secured by Letters Patent of the United States is:

1. The method of molding a rigid structure with undercut sections in a two-part mold which comprises inserting in the mold cavity a flexible tube filled with a plurality of strands of material such as fiber glass with the ends of said tube protruding from said mold, arranging said tube in said mold to extend into protruding portions of said mold, inserting into said mold in liquid form at temperatures of between 100° and 200° F. a thermosetting plastic compound, curing said compound at a temperature of between 300° and 400° F. while still in said mold, removing said molded compound from said mold before cooling down to room temperature whereby undercut portions may readily be removed, and filling said tube and impregnating the fibers contained therein with a self-curing resin compound which hardens to form a rigid supporting frame for said structure.

2. An anatomical model comprising a molded structure of vinyl resin accurately reproducing the details of nature, means for lending rigidity to protruding portions of said model comprising a readily bendable tube molded into said model, elongated fibers filling said tube and a resin impregnating said fibers to produce a rigid tube of any desired shape.

3. An anatomical model comprising a molded structure of vinyl resin accurately reproducing the details of nature, means for lending rigidity to protruding portions of said model comprising a readily bendable tube molded into said model, elongated glass fibers filling said tube and a self-curing resin impregnating said fibers to produce a rigid tube of any desired shape.

4. The method of molding a rigid structure with undercut portions in a two-part mold which comprises inserting in the mold cavity a flexible tube filled with a plurality of strands of material such as fiber glass with the ends of said tube protruding from said mold, arranging said tube in said mold to extend into protruding portions of said mold, inserting into said mold in liquid form at a temperature of about 350° F. a vinyl resin, curing said compound at a temperature of about 350° F. while still in said mold, removing said molded compound from said mold before cooling down to room temperature whereby undercut portions may readily be removed from said mold, and filling said tube and impregnating the fibers contained therein with a self-curing resin compound which hardens to form a rigid supporting frame for said structure.

5. An anatomical model of a human being as well as zoological creatures, comprising a molded structure accurately reproducing the details of nature having a pelvic region including a recess defined approximately by laterally spaced lines along the lateral margin of the urinary bladder at each side thereof extending from the pubic ramus of the adjacent side to the perirectal fossa, a second line extending from each said lateral fossa line inferiorly to the perirectal area of the anus, defining the posterior boundary, and a line extending inferiorly from each first mentioned line at the lateral pubic ramus including therebetween the pubic mons and margins of the thighs and genital folds defining the anterior boundary and a plurality of model units shaped to interchangeably fit in said recess, one said unit having the external female genitalia and another said unit having the external male genitalia.

6. An anatomical model as set forth in claim 5, in which each unit is bisected and portrays internally the details of the respective genitalia of the male and the female.

7. An anatomical model as set forth in claim 5, including a unit adapted to fit the pelvic recess and having an anterior exterior portraying a sexless form.

8. An anatomical model of the character described comprising a molded structure of thermosetting resin compound accurately reproducing the details of nature, and one or more tubular elements embedded in said molded structure and arranged to generally follow certain contours thereof, a plurality of strands such as fibre glass being inserted into said tubular elements substantially throughout the length thereof, and said tubular elements being filled with a thermosetting resin compound which impregnates said fibre glass and hardens to form a rigid supporting frame for said molded structure.

References Cited in the file of this patent

UNITED STATES PATENTS

| | | |
|---|---|---|
| 2,034,446 | Saxe | Mar. 17, 1936 |
| 2,058,856 | Diehl | Oct. 27, 1936 |
| 2,324,702 | Hoffmann et al. | July 20, 1943 |
| 2,473,723 | Nelson | June 21, 1949 |
| 2,483,034 | Braeg | Sept. 27, 1949 |
| 2,526,945 | Gray | Oct. 24, 1950 |
| 2,551,433 | Graves | May 1, 1951 |

FOREIGN PATENTS

| | | |
|---|---|---|
| 4,602 | Great Britain | 1912 |
| 600,270 | Great Britain | Apr. 5, 1948 |
| 606,936 | Great Britain | Aug. 23, 1948 |

OTHER REFERENCES

"Durolatex Models of Human Anatomy," pamphlet comprising 8 pages published by Chicago Apparatus Co., 1735 North Ashland Ave., Chicago, Illinois; received in Patent Office December 18, 1939.